Figures 1, 2:
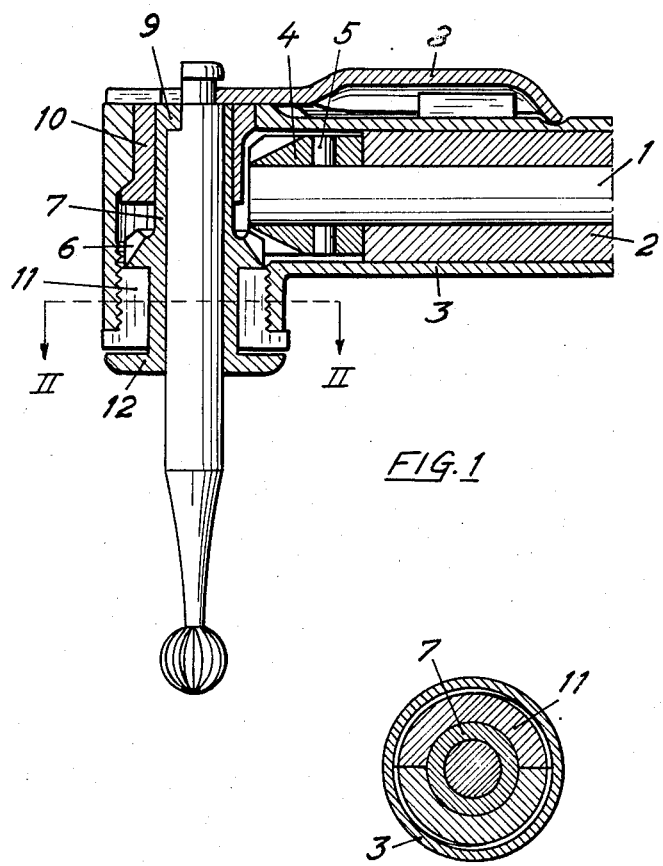

Sept. 18, 1951  G. E. BJÖRKLUND  2,568,315
CONTRAANGLE DENTAL HANDPIECE
Filed March 15, 1947

Inventor:
Gustaf Erik Björklund
By Jarvis C. Marble
his Attorney

Patented Sept. 18, 1951

2,568,315

UNITED STATES PATENT OFFICE 2,568,315

CONTRA-ANGLE DENTAL HANDPIECE

Gustaf Erik Björklund, Stockholm, Sweden

Application March 15, 1947, Serial No. 734,905
In Sweden March 20, 1946

3 Claims. (Cl. 32—27)

The present invention refers to contraangle handpieces for dental drills in which the driving shaft forms an angle, preferably a right angle, with the axis of rotation of the drill. The motion of the driving shaft is usually transmitted to the drill by means of a bevel gear, worm gear or similar arrangement. Having regard to the use of the handpiece this must be given such small dimensions that the bearing arrangements of the drill spindle will be very highly stressed.

The forces acting upon the drill spindle during the drilling operation are firstly radial and secondly axial or may be regarded as compounded from components with these directions. The radial forces are taken up by two radial bearings which are located one at each side of the place where the driving shaft is geared to the drill spindle. In the known constructions the axial forces are taken up by a thrust bearing which is located between the said place of gearing and the end of the drill spindle lying farthest away from the drill point. However this could not be done without the radial bearing suffering as it was necessary for want of space to reduce the dimensions of the radial bearing located at this end so that its specific load became high. This has resulted in a comparatively rapid wear of the bearing.

This drawback has been removed in the contraangle handpiece according to the present invention by the thrust bearing being placed at the end of the drill spindle which is located nearest to the drill point. In this case it has been possible to obtain the desired thrust bearing without impairing the radial bearing. Through the new location of the thrust bearing other advantages have also been gained which will be more apparent from the following description, refering to the accompanying drawing.

In the drawing which illustrates one form of the contraangle handpiece according to the invention, Fig. 1 shows a longitudinal section of the handpiece on a highly enlarged scale.

Fig. 2 shows a cross-section in a plane through the line II—II, of Fig. 1.

In Fig. 1, I is the driving shaft which receives its motion from an electric motor in the way that is common in dental drilling machines. The shaft I is journalled in a sleeve 2 which in a manner not shown is firmly arranged on the handle of the handpiece. The sleeve is arranged in a gear casing 3 which is also fixed to the handle. To the front end of the driving shaft a pinion 4 is fastened by means of a pin 5 passing through the shaft. The pinion meshes with a rim of teeth 6 on a spindle sleeve 7 journalled in the gear casing and forming a right angle with the driving shaft. The spindle sleeve is provided with a central bore in which the shank of a drill may be inserted and attached. The locking of the drill axially is effected by means of a displaceable slide 8 which can be pushed into an annular slot at the upper end of the drill. Turning of the drill in relation to the spindle sleeve is prevented by means of a projection 9 arranged in the upper part of the spindle sleeve and extending into the bore of the spindle sleeve which projection coacts with a complementary recess in the upper part of the drill. At its opposite lower end the drill has a drill head provided with edges. At its upper end which is remote from the drill point the spindle sleeve is provided with a bearing surface taking up radial bearing pressure which surface co-operates with a bearing sleeve 10 fixed in the gear casing. At its opposite end the spindle sleeve is journalled in a bushing 11 which is located between the rim of teeth meshing with the driving shaft and a flange 12 arranged on the spindle sleeve at the end facing the drill point. The bushing 11 is threaded in the gear casing and is split in a plane through the centre axis of the spindle sleeve in order to be put in its position, as will be more clear from Fig. 2. The axial drill pressure is taken up by the plane inner surface of the flange which co-operates with the end surface of the bushing, and the part of the spindle sleeve lying between the rim of teeth, and the flange takes up radial bearing pressure in co-operation with the inner cylindrical surface of the bushing.

In the described construction the specific bearing pressure can be reduced to a fractional part only of that usual in known constructions. This has special reference to the upper radial bearing in which the bearing pressure has been reduced to such a degree that the bearing sleeve 10 can be made of bronze. This involves in its turn manufacturing advantages of great value. The bearing sleeve can thus be pressed into its place without any further arrangements for its mounting being needed. The bearing surface of the sleeve can thereafter be adjusted by reaming, while the reamer is guided in the bearing bushing 11 through which the centre line of the bearing surface of the sleeve will coincide exactly with the centre line of the bearing bushing. Of course these advantages are not only to be found in the original manufacture but in a particularly high degree when a bearing sleeve is replaced on account of wear.

The thrust bearing formed by the flange 12 and the bearing bushing 11 is located wholly outside the gear casing. By this means the advantage is gained that the bearing surface can be given greater diameter than the inner diameter of the gear casing, so that the bearing surface will be greater and consequently the specific bearing pressure smaller than in the known constructions where the thrust bearing is arranged in the gear casing. The further advantage is gained that the rotating flange 12 will act to throw off boring chips which are thrown up against the handpiece during the boring operation. As these chips impinge upon the flange, they are thrown tangentially outwardly by centrifugal force and are thus prevented from entering between the bearing surfaces.

The invention is not limited to the shown and described form but may be varied in different ways within the limits indicated by the claims. By way of example the thrust bearing may be located in another place between the rim of teeth and the end of the spindle sleeve facing the drill point. The flange may thus be arranged in the interior of the gear casing between a shoulder in the same and the bearing bushing. Instead of making the bearing bushing split one may manufacture the spindle sleeve in two parts which are joined together by means of threads or otherwise.

What I claim is:

1. A contraangle handpiece for dental drills having a shank and a working head comprising a casing, a spindle sleeve rotatably mounted in said casing for holding a drill shank, a driving shaft rotatably mounted in said casing for rotation about an axis angularly related to the axis of said sleeve, gearing connecting said shaft and said sleeve at a place intermediate the ends of the latter, a bearing sleeve fixed in said casing and having an internal bearing surface engaging the portion of the spindle sleeve on the side of the gearing remote from the working head of the drill to provide a radial bearing for the spindle sleeve, said spindle sleeve having a circumferentially extending flange located outside of said casing on the side of said gearing adjacent to said drill head, said flange having an upper bearing surface, and a bushing fixed in said casing and having a lower bearing surface engaging said flange bearing surface to provide a thrust bearing for absorbing the axial thrust from said drill, said bushing further having an internal bearing surface engaging said spindle sleeve to provide a second radial bearing therefor.

2. A device as set forth in claim 1 in which said casing is provided with an externally threaded opening through which said sleeve extends, said sleeve is provided with a shoulder having teeth on the upper surface to engage said gearing and a plane lower surface, and said bushing has a plane upper surface and is externally threaded and axially split to permit assembly thereof within said threaded opening of said casing and around the portion of the spindle sleeve between said shoulder and said flange.

3. A device as set forth in claim 1 in which said bushing includes a flange portion extending radially between the end of said casing and the flange on said spindle sleeve.

GUSTAF ERIK BJÖRKLUND.

REFERENCES CITED

The following references are of record in the file of this patent:

UNITED STATES PATENTS

| Number | Name | Date |
| --- | --- | --- |
| 1,380,717 | Herman | June 7, 1921 |
| 1,458,293 | Hinchey | June 12, 1923 |
| 1,548,180 | Brown et al. | Aug. 4, 1928 |
| 1,717,873 | Brush | June 18, 1929 |
| 2,025,779 | Roelke | Dec. 31, 1935 |

FOREIGN PATENTS

| Number | Country | Date |
| --- | --- | --- |
| 238,248 | Great Britain | Aug. 7, 1925 |
| 733,386 | France | Oct. 5, 1932 |